United States Patent
Takayama

(10) Patent No.: US 9,409,814 B2
(45) Date of Patent: *Aug. 9, 2016

(54) CRYSTALLINE GLASS COMPOSITION AND ADHESIVE MATERIAL USING SAME

(75) Inventor: Yoshihisa Takayama, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/239,844

(22) PCT Filed: Aug. 13, 2012

(86) PCT No.: PCT/JP2012/070633
§ 371 (c)(1),
(2), (4) Date: Feb. 20, 2014

(87) PCT Pub. No.: WO2013/035500
PCT Pub. Date: Mar. 14, 2013

(65) Prior Publication Data
US 2014/0221190 A1    Aug. 7, 2014

(30) Foreign Application Priority Data
Sep. 8, 2011    (JP) ................... 2011-195588

(51) Int. Cl.
*C03C 8/24* (2006.01)
*C03C 8/02* (2006.01)
(Continued)

(52) U.S. Cl.
CPC . *C03C 8/04* (2013.01); *C03C 3/064* (2013.01); *C03C 3/066* (2013.01); *C03C 3/068* (2013.01); *C03C 8/02* (2013.01); *C03C 8/24* (2013.01);
(Continued)

(58) Field of Classification Search
CPC .............. C03C 8/02; C03C 8/04; C03C 8/24; H01M 8/0282
See application file for complete search history.

(56) References Cited

U.S. PATENT DOCUMENTS 4,464,475 A * 8/1984 Beall et al. .................. 501/9
5,242,722 A * 9/1993 Hiraka et al. ............ 428/34.6
(Continued)

FOREIGN PATENT DOCUMENTS

CN    103987673 A    8/2014
JP    2002-362937 A    12/2002
(Continued)

OTHER PUBLICATIONS

English translation of Official Communication issued in corresponding International Application PCT/JP2012/070633, mailed on Mar. 20, 2014.
(Continued)

*Primary Examiner* — Karl Group
(74) *Attorney, Agent, or Firm* — Keating and Bennett, LLP

(57) ABSTRACT

Provided is a crystallizable glass composition which exhibits a high coefficient of thermal expansion after undergoing thermal treatment, has excellent fluidity during the thermal treatment, and is less likely to deteriorate the hermeticity and adhesiveness at bonded portions and volatilize glass components even when exposed to high temperatures for a long period after the thermal treatment. A crystallizable glass composition capable of precipitating MgO-based crystals as main crystals by thermal treatment, the crystallizable glass composition containing, in terms of % by mole in glass component composition, 0.1 to 30% $La_2O_3+Nb_2O_5+Y_2O_3+Ta_2O_5+Yb_2O_3$.

8 Claims, 1 Drawing Sheet

(51) Int. Cl.
  C03C 8/04      (2006.01)
  H01M 8/02      (2016.01)
  C03C 3/064     (2006.01)
  C03C 3/066     (2006.01)
  C03C 3/068     (2006.01)
  C03C 10/00     (2006.01)
  H01M 8/12      (2016.01)

(52) U.S. Cl.
  CPC ............ *C03C 10/00* (2013.01); *C03C 10/0009* (2013.01); *H01M 8/0282* (2013.01); *H01M 2008/1293* (2013.01); *Y02E 60/50* (2013.01); *Y02E 60/525* (2013.01)

(56) References Cited

U.S. PATENT DOCUMENTS

| | | | | |
|---|---|---|---|---|
| 7,189,668 B2 * | 3/2007 | Budd | ................................ | 501/5 |
| 7,521,387 B2 * | 4/2009 | Xue et al. | ........................ | 501/15 |
| 8,178,453 B2 * | 5/2012 | Tanida et al. | .................... | 501/73 |
| 8,288,298 B2 * | 10/2012 | Mayumi et al. | ................. | 501/15 |
| 2006/0019813 A1 | 1/2006 | Yoshii | | |
| 2006/0063659 A1 * | 3/2006 | Xue et al. | ........................ | 501/15 |
| 2007/0287012 A1 | 12/2007 | Kawai et al. | | |
| 2010/0129726 A1 | 5/2010 | Tanida et al. | | |
| 2015/0031524 A1 * | 1/2015 | Takayama | ....................... | 501/14 |

FOREIGN PATENT DOCUMENTS

| | | | |
|---|---|---|---|
| JP | 2002362937 | * | 12/2002 |
| JP | 2006-056769 A | | 3/2006 |
| JP | 2007-161569 A | | 6/2007 |
| JP | 2007-294862 A | | 11/2007 |
| JP | 2012-162445 A | | 8/2012 |
| WO | 2009/017173 A1 | | 2/2009 |

OTHER PUBLICATIONS

Official Communication issued in International Patent Application No. PCT/JP2012/070633, mailed on Oct. 9, 2012.

* cited by examiner

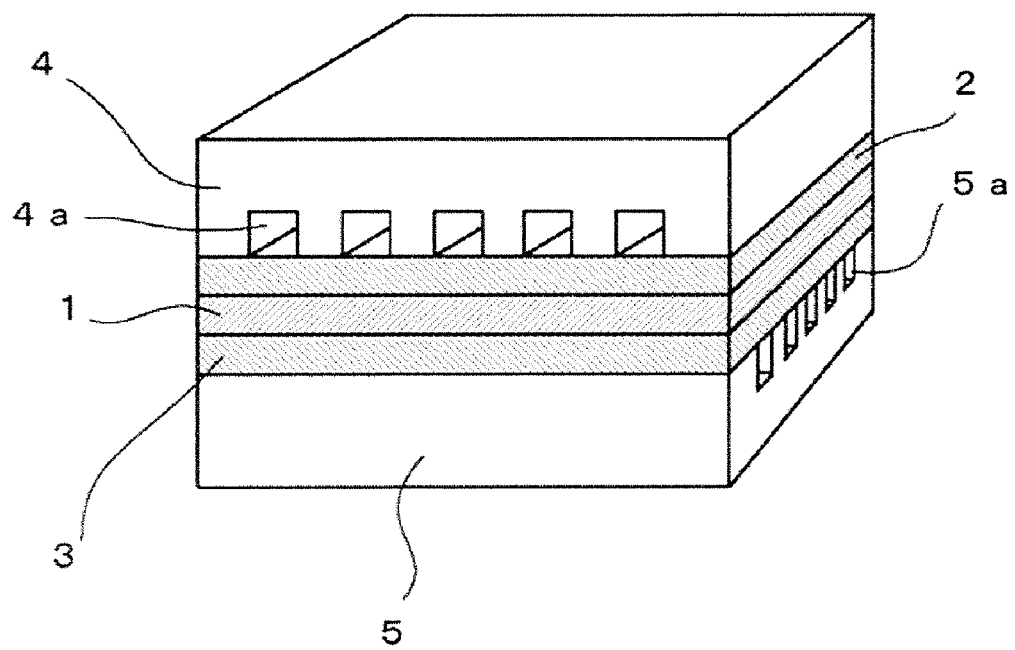

CRYSTALLINE GLASS COMPOSITION AND ADHESIVE MATERIAL USING SAME

TECHNICAL FIELD

The present invention relates to crystallizable glass compositions and adhesive materials using the same and more particularly relates to a crystallizable glass composition suitable for bonding metals, such as SUS and Fe, and high-expansion ceramics, such as ferrite and zirconia, and an adhesive material using the same.

BACKGROUND ART

Fuel cells have recently received attention as an important technique which can achieve high energy efficiency and significantly reduce emission of $CO_2$. The type of fuel cell varies with the type of electrolyte used. For example, fuel cells for industrial application fall into four types: a phosphoric-acid fuel cell (PAFC), a molten carbonate fuel cell (MCFC), a solid oxide fuel cell (SOFC), and a polymer electrolyte fuel cell (PEFC). Among them, the SOFC exhibits small intracellular resistance and is therefore known for its highest power generation efficiency in the fuel cells. In addition, the SOFC need not use any precious metal as a catalyst and therefore has the advantage that production costs can be kept down. For these reasons, the SOFC is a system widely applicable from small-scale applications, such as those for domestic use, to large-scale applications, such as a power plant, and expectations have been raised for its potential.

The FIGURE shows the structure of a general planar SOFC. As shown in the figure, a general planar SOFC includes a cell in which an electrolyte 1 made of ceramic, such as yttria-stabilized zirconia (YSZ), an anode 2 made such as of Ni/YSZ, and a cathode 3 made such as of (La, Ca)$CrO_3$ are layered and integrated. In addition, a first support substrate 4 adjoining the anode and a second support substrate 5 adjoining the cathode are fixed to the top and bottom, respectively, of the cell. The support substrates 4 and 5 are made of metal, such as SUS. The first support substrate 4 has fuel channels 4a formed therein to serve as passages of fuel gas, while the second support substrate 5 has air channels 5a formed therein to serve as passages of air. The fuel channels 4a and the air channels 5a are formed perpendicularly to each other.

In generating electric power using the planar SOFC having the above structure, a fuel gas, such as hydrogen, town gas, natural gas, biogas or liquid fuel, is allowed to flow through the fuel channels 4a in the first support substrate 4 and concurrently air (or oxygen) is allowed to flow through the air channels 5a in the second support substrate 5. During this time, the cathode develops a reaction of $½O_2+2e^-→O^{2-}$, while the anode develops a reaction of $H_2+O^{2-}→H_2O+2e^-$. By these reactions, chemical energy can be converted directly into electric energy to generate electric power. To provide high-power current, an actual planar SOFC has a structure in which a number of units shown in the figure are layered.

In producing the planar SOFC, each of its component elements needs to be hermetically sealed to prevent the gases flowing through the anode and cathode from being mixed. Specifically, hermetic sealing between the support substrates, bonding of the solid electrolyte to the support substrates or hermetic sealing between solid electrolytes is necessary. For this purpose, there has been proposed a method for hermetically sealing the component elements by interlaying a sheet-shaped gasket made of inorganic material, such as mica, vermiculite or alumina, between the component elements. However, this method is simply to physically interlay the gasket between the component elements and does not involve bonding them, which may cause a tiny amount of gas leakage, resulting in poor fuel use efficiency. Therefore, consideration has been given to a method for bonding the component elements by melting using a glass material.

Each of the component elements for use in the SOFC is generally made of high-expansion metal or ceramic. Therefore, in bonding these elements using a glass material, it is necessary to conform the coefficient of thermal expansion of the glass material to those of the elements. Furthermore, the temperature range of the SOFC in which an electrochemical reaction occurs (i.e., the operating temperature range) is as high as approximately 600 to 800° C. and the SOFC is operated in this temperature range over a long period. Therefore, the glass material is required to have high thermal resistance to avoid, even when exposed to high temperatures for a long period, deterioration in hermeticity and adhesiveness due to melting of bonded portions and degradation in power generation property due to volatilization of glass components.

As a glass material having high-expansion property, a $SiO_2$—CaO—MgO-based crystallizable glass composition is proposed which can precipitate CaO—MgO—$SiO_2$-based crystals by thermal treatment to exhibit a high coefficient of expansion, as disclosed, for example, in Patent Literature 1. Furthermore, Patent Literature 2 discloses a $SiO_2$—$B_2O_2$—SrO-based amorphous glass composition which has high density after being sealed and provides stable gas sealing property.

CITATION LIST

Patent Literature

Patent Literature 1: WO09/017173
Patent Literature 2: JP-A-2006-56769

SUMMARY OF INVENTION

Technical Problem

The crystallizable glass composition disclosed in Patent Literature 1 has high viscosity at high temperatures and therefore has poor fluidity, which presents a problem of difficulty in achieving stable sealing property.

The amorphous glass composition disclosed in Patent Literature 2 precipitates no crystal even when undergoing thermal treatment. In addition, its glass transition point is near 600° C., which presents a problem in that under a working environment at 600 to 800° C. the bonded portions may melt to easily deteriorate the hermeticity and adhesiveness.

An object of the present invention is to provide a crystallizable glass composition which exhibits a high coefficient of thermal expansion after undergoing thermal treatment, has excellent fluidity during the thermal treatment, and is less likely to deteriorate the hermeticity and adhesiveness at the bonded portions even when exposed to high temperatures for a long period after the thermal treatment.

Solution to Problem

The present invention relates to a crystallizable glass composition which is capable of precipitating MgO-based crystals as main crystals by thermal treatment and contains, in terms of % by mole in glass component composition, 0.1 to 30% $La_2O_3+Nb_2O_5+Y_2O_3+Ta_2O_5+Yb_2O_3$.

The crystallizable glass of the present invention precipitates MgO-based crystals of relatively low melting point as main crystals by thermal treatment. Therefore, the bonded portions are less likely to melt, so that the deterioration thereof in hermeticity and adhesiveness can be reduced. In addition, the crystallizable glass exhibits a high coefficient of thermal expansion. Therefore, it can conform in coefficient of thermal expansion to a metal or ceramic as an element to be bonded.

To use a crystallizable glass composition as an adhesive material, it is necessary to sufficiently soften and fluidize it before crystallizing. In this relation, the inventor has conducted various experiments and found from the results thereof that if a crystallizable glass composition contains any one of $La_2O_3$, $Nb_2O_5$, $Y_2O_3$, $Ta_2O_5$, and $Yb_2O_3$, it can be given fluidity suitable for bonding elements before its crystallization occurs.

Since, as described above, the crystallizable glass composition of the present invention has excellent fluidity before crystallizing and has the property of precipitating MgO-based crystals when fluidized to some extent, it is excellent in both the workability during bonding and the thermal resistance after bonding.

The term "crystallizable glass composition" in the present invention means a glass composition having the property of precipitating crystals from a glass matrix when undergoing thermal treatment.

The term "thermal treatment" herein means sufficiently promoting crystallization at a crystallization temperature or above and refers to thermal treatment under conditions of at least 800° C. or above for 10 minutes or more.

The phrase "precipitating MgO-based crystals as main crystals" means that, out of types of crystals precipitated, the content of MgO-based crystals are the highest.

Note that "substantially free of these components" herein means that the components are not positively used as raw materials and does not mean to exclude the level at which they may be unavoidably incorporated as impurities. Objectively, this means that the content of each of the components is below 0.1% by mole.

Secondly, the crystallizable glass composition of the present invention preferably contains 0.1 to 30% $La_2O_3$.

$La_2O_3$ is very effective particularly in improving the fluidity. Therefore, by positively containing $La_2O_3$, a crystallizable glass composition exhibiting high fluidity can be easily obtained.

Thirdly, the crystallizable glass composition of the present invention preferably contains, in terms of % by mole in component composition, 5% or less $R_2O$ (where R represents Li, Na or K) and 5% or less $P_2O_5$.

Alkali metal oxides and $P_2O_5$ have the effect of improving the fluidity in the crystallizable glass composition but have a problem in that they may be likely to volatilize when exposed to high temperatures for a long period. Therefore, by restricting the contents of these components as described above, the degradation in power generation property due to volatilization of the glass components can be reduced.

Fourthly, in the crystallizable glass composition of the present invention, the MgO-based crystals are preferably $2MgO.SiO_2$, $BaO.2MgO.2SiO_2$ or $2MgO.B_2O_3$.

Fifthly, the crystallizable glass composition of the present invention preferably contains, in terms of % by mole in glass component composition, 30% to 50% $SiO_2$, 10 to 45% MgO, 5 to 40% BaO, and 0 to 15% $B_2O_2$.

By having the above composition, MgO-based crystals can be easily precipitated.

Sixthly, the crystallizable glass composition of the present invention preferably further contains, in terms of % by mole in glass component composition, 0 to 20% CaO, 0 to 10% SrO, 0 to 15% ZnO, 0 to 6% $Al_2O_2$, 0 to 3% $ZrO_2$, and 0 to 3% $SnO_2$.

Seventhly, the crystallizable glass composition of the present invention preferably has, after undergoing the thermal treatment, a coefficient of thermal expansion of $95 \times 10^{-7}$/° C. or above at 30 to 700° C.

Eighthly, the crystallizable glass composition of the present invention is preferably in powder form.

With the above form, the crystallizable glass composition can be easy to use as an adhesive material.

Ninthly, the present invention relates to an adhesive material in which any one of the above crystallizable glass compositions is used.

Tenthly, the adhesive material of the present invention is preferably used for bonding component elements of a fuel cell. Advantageous Effects of Invention The crystallizable glass composition of the present invention exhibits fluidity suitable for bonding and a high coefficient of thermal expansion after undergoing the thermal treatment. In addition, since the crystallizable glass composition after undergoing the thermal treatment has high thermal resistance, it is less likely to volatilize its glass components even when exposed to high temperatures over a long period. Therefore, the crystallizable glass composition of the present invention is suitable for bonding and coating of high-expansion metals, ceramics, and the like and particularly suitable as an adhesive material for component elements of a fuel cell, such as an SOFC.

BRIEF DESCRIPTION OF DRAWINGS

The FIGURE is an illustration showing the basic structure of an SOFC.

DESCRIPTION OF EMBODIMENTS

A crystallizable glass composition of the present invention is characterized in that it precipitates MgO-based crystals as main crystals by thermal treatment. No particular limitation is placed on the type of the MgO-based crystal and examples include $2MgO.SiO_2$, $BaO.2MgO.2SiO_2$, and $2MgO.B_2O_3$. The content of the MgO-based crystals in the glass composition after undergoing the thermal treatment (after crystallizing) is preferably 50% by mass or more, more preferably 70% by mass or more, and particularly preferably 90% by mass or more. If the content of the MgO-based crystals in the glass composition after undergoing the thermal treatment is too small, the bonded portions will be melted by exposure to high temperatures for a long period, resulting in ease of deterioration in hermeticity and adhesiveness of the bonded portions. In addition, the coefficient of thermal expansion will be small, so that the glass composition may be likely to cause defects, such as cracks, when used to bond elements made of metal or ceramic having a high coefficient of thermal expansion.

To improve the fluidity, the crystallizable glass composition of the present invention contains, in terms of % by mole in glass component composition, 0.1 to 30% $La_2O_3+Nb_2O_5+Y_2O_3+Ta_2O_5+Yb_2O_3$. If the content of these components is too small, the effect of improving the fluidity is difficult to achieve. On the other hand, if the content of these components is too large, the glass composition becomes likely to devitrify during melting thereof or bonding of elements and the fluidity becomes likely to decrease. In addition, the crystallinity will be decreased to result in insufficient precipitation of crystals, so that the thermal resistance is likely to decrease. The preferred range of contents of $La_2O_3+Nb_2O_5+Y_2O_3+Ta_2O_5+$ $Yb_2O_3$ is 1 to 27% and the more preferred range thereof is 3 to 24%. Note that the preferred range of contents of each component of $La_2O_3$, $Nb_2O_5$, $Y_2O_3$, $Ta_2O_5$, and $Yb_2O_3$ is 0.1 to 30%, the more preferred range thereof is 1 to 27%, and the still more preferred range thereof is 3 to 24%. Among these components, $La_2O_3$ is very effective in improving the fluidity. Therefore, by positively containing $La_2O_3$, a crystallizable glass composition exhibiting high fluidity can be easily obtained.

To facilitate the precipitation of MgO-based crystals, the crystallizable glass composition of the present invention preferably contains, in terms of % by mole in glass component composition, 30% to 50% $SiO_2$, 10 to 45% MgO, 5 to 40% BaO, and 0 to 15% $B_2O_3$. A description will be given below of detailed reasons why each of the components is limited as described above.

$SiO_2$ is a component for facilitating vitrification and improving water resistance and thermal resistance. The $SiO_2$ content is preferably 30 to 50%, more preferably 31 to 49%, and particularly preferably 31 to 45%. If the $SiO_2$ content is too small, vitrification may be difficult to achieve. On the other hand, if the $SiO_2$ content is too large, crystals may be difficult to precipitate even when the glass composition undergoes the thermal treatment. In addition, the melting temperature tends to increase to make it difficult to melt the glass composition.

MgO is an essential component of the MgO-based crystal. The MgO content is preferably 10 to 45%, more preferably 10 to 44%, and particularly preferably 15 to 43%. If the MgO content is too small, MgO-based crystals will not be sufficiently precipitated when the glass composition undergoes the thermal treatment, so that the thermal resistance may be likely to decrease. In addition, the coefficient of thermal expansion is likely to be low. On the other hand, if the MgO content is too large, the vitrification range tends to narrow, so that homogeneous glass may be difficult to obtain.

BaO is a component for widening the vitrification range to reduce the devitrification during melting or bonding and providing fluidity suitable for bonding. The BaO content is preferably 5 to 40%, more preferably 6 to 38%, and particularly preferably 8 to 35%. If the BaO content is too small, the glass composition will be likely to devitrify during melting or bonding, so that fluidity suitable for bonding may be difficult to achieve. On the other hand, if the BaO content is too large, the crystallinity will be decreased to result in insufficient precipitation of crystals, so that the thermal resistance may be likely to decrease. In addition, the coefficient of thermal expansion is likely to be low.

$B_2O_3$ is a component for improving the fluidity and the content thereof is preferably 0 to 15%, more preferably 0 to 13%, and particularly preferably 0.1 to 11%. If the $B_2O_3$ content is too large, surplus $B_2O_3$ component having not precipitated as crystals may cause reduction in water resistance and thermal resistance and may be likely to volatilize at high temperatures.

If the glass composition contains $B_2O_3$, the $MgO/B_2O_3$ ratio is, in terms of molar ratio, preferably 2.0 or more, more preferably 2.1 or more, and particularly preferably 2.3 or more. By doing this, $2MgO.B_2O_3$ crystals become likely to precipitate, so that the volatilization of $B_2O_3$ will be reduced even in use at high temperatures for a long period and high thermal resistance will be easy to achieve.

Besides the above components, the crystallizable glass composition of the present invention preferably contains, in terms of % by mole in glass component composition, 0 to 20% CaO, 0 to 10% SrO, 0 to 15% ZnO, 0 to 6% $Al_2O_3$, 0 to 3% $ZrO_2$, and 0 to 3% $SnO_2$. The reasons why the glass component composition is defined as described above will be described below.

CaO is a component for increasing the coefficient of thermal expansion and the content thereof is preferably 0 to 20%, more preferably 0 to 18%, and particularly preferably 0.1 to 16%. If the CaO content is too large, the amount of MgO-based crystals precipitated will be small, so that the thermal resistance tends to decrease.

SrO is a component for increasing the coefficient of thermal expansion and the content thereof is preferably 0 to 10%, more preferably 0 to 5%, and particularly preferably 0.1 to 4%. If the SrO content is too large, $SrO.SiO_2$ crystals of low coefficient of thermal expansion will be likely to precipitate, which may make it difficult to obtain a crystallizable glass having high expansion property.

ZnO is a component for facilitating vitrification and decreasing the softening point to enable bonding at low temperatures. The ZnO content is preferably 0 to 15%, more preferably 0 to 13%, and particularly preferably 0.1 to 11%. If the ZnO content is too large, the thermal resistance may be likely to decrease.

$Al_2O_3$ is a component for controlling the viscosity and the content thereof is preferably 0 to 6%, more preferably 0 to 5.5%, and particularly preferably 0.1 to 5%. If the $Al_2O_3$ content is too large, $5SiO_2.2Al_2O_2.2MgO$ crystals of low coefficient of thermal expansion will be likely to precipitate, which may make it difficult to obtain a crystallizable glass having high expansion property.

$ZrO_2$ is a component for improving the water resistance and the content thereof is preferably 0 to 3%, more preferably 0 to 2.5%, and particularly preferably 0 to 2%. If the $ZrO_2$ content is too large, the glass composition will be likely to devitrify during melting or bonding, so that fluidity suitable for bonding may be difficult to achieve.

$SnO_2$ is a component for improving the water resistance and the content thereof is preferably 0 to 3%, more preferably 0 to 2.5%, and particularly preferably 0.1 to 2%. If the $SnO_2$ content is too large, the glass composition will be likely to devitrify during melting or bonding, so that fluidity suitable for bonding may be difficult to achieve.

$R_2O$ (where R represents Li, Na or K) and $P_2O_5$ are likely to volatilize at high temperatures and likely to decrease the electrical insulation. Therefore, with the use of these components for bonding component elements of a fuel cell, the fuel cell may decrease the power generation property. For this reason, the content of each of $R_2O$ and $P_2O_5$ is preferably 5% or less, more preferably 3% or less, particularly preferably 1% or less. Most preferably, the glass composition is substantially free of these components. Note that "substantially free of these components" means that no amount of these components are deliberately incorporated into the glass and does not mean to completely exclude even unavoidable impurities. Objectively, this means that the content of each of these components including impurities is below 0.1%.

The coefficient of thermal expansion of the crystallizable glass composition of the present invention is, at 30 to 700° C. after undergoing the thermal treatment, preferably $95 \times 10^{-7}/°$ C. or above, more preferably $100 \times 10^{-7}/°$ C. or above, and particularly preferably $110 \times 10^{-7}/°$ C. or above. If the coefficient of thermal expansion is too low, the difference in coefficient of thermal expansion between the glass composition and a metal, ceramic or the like as an element to be bonded becomes large, so that the glass composition may be likely to cause defects, such as cracks. On the other hand, no particular limitation is placed on the upper limit of the coefficient of thermal expansion but it is on a realistic level not higher than $160 \times 10^{-7}/°C$.

The coefficient of thermal expansion of the crystallizable glass composition after undergoing the thermal treatment can be measured, for example, in the case where the crystallizable glass composition is in powder form, using a mass of crystallized glass produced by pressing a powdered crystallizable glass composition into a shape and then subjecting it to thermal treatment.

No particular limitation is placed on the form of the crystallizable glass composition of the present invention, but in powder form it can be easy to use as an adhesive material. In this case, the powdered crystallizable glass composition (hereinafter, referred to as "crystallizable glass powder") preferably has a particle size ($d_{50}$) of about 2 to about 20 μm.

If the particle size of the crystallizable glass powder is too small, the crystallizable glass powder maybe difficult to treat. On the other hand, if the particle size of the crystallizable glass powder is too large, pores may remain in the adhering layer after firing, so that the bonding strength tends to be poor.

To control the fluidity or the coefficient of thermal expansion, the crystallizable glass powder may contain filler powder, such as magnesium phosphate ($3MgO \cdot P_2O_5$), magnesia (MgO), zinc oxide (ZnO), zirconia ($ZrO_2$), titania ($TiO_2$), alumina ($Al_2O_3$) or the like, added thereto. The content of the filler powder in the adhesive material is preferably 0.1 to 10 parts by mass and particularly preferably 1 to 8 parts by mass relative to 100 parts by mass of crystallizable glass powder. If the content of filler powder is too small, the above effect may be difficult to achieve. On the other hand, if the content of filler powder is too large, the fluidity tends to excessively decrease. The particle size (d50) of the filler powder to be used is preferably about 0.2 to about 20 μm. If the particle size of the filler powder is too small, the filler powder may melt into the crystallizable glass powder during firing, which may make it difficult to achieve the effect of controlling the coefficient of thermal expansion. On the other hand, if the particle size of the filler powder is too large, the fluidity tends to excessively decrease.

Next, a description will be given of an example of a method for using the crystallizable glass composition of the present invention as an adhesive material.

First, a glass raw material prepared to have the component composition as described above is melted, for example, at 1400 to 1500° C. for 0.5 to 2 hours. Next, the molten glass is formed such as in a film, ground, and classified to obtain crystallizable glass powder.

Various types of filler powders if necessary, an organic solvent, a resin, a plasticizer, a dispersant, and so on are added to the crystallizable glass powder and kneaded to obtain a paste.

The organic solvent is a material for impasting the crystallizable glass powder and, for example, terpineol, diethylene glycol monobutyl ether, diethylene glycol monobutyl ether acetate, 2,2,4-trimethyl-1,3-pentanediol monoisobutyrate or dihydroterpineol can be used alone or by a mixture of them.

The content of the organic solvent is generally about 10 to about 40% by mass.

The resin is a component for increasing the film strength after being dried and for giving flexibility and the content thereof is generally about 0.1 to about 20% by mass. The resins that can be used include thermoplastic resins, specifically, polybutyl methacrylate, polyvinyl butyral, polymethyl methacrylate, polyethyl methacrylate, and ethyl cellulose and these compounds can be used alone or by a mixture of them.

The plasticizer is a component for controlling the drying speed and giving flexibility to the dried film and the content thereof is generally about 0 to about 10% by mass. The plasticizers that can be used include butyl benzyl phthalate, dioctyl phthalate, diisooctyl phthalate, dicapryl phthalate, and dibutyl phthalate and these compounds can be used alone or by a mixture of them.

The dispersants that can be used include ionic dispersants and non-ionic dispersants. The ionic dispersants that can be used include carboxylic acid-based dispersants, polycarboxylic acid-based dispersants, such as dicarboxylic acid-based dispersants, and amine dispersants; and the non-ionic dispersants that can be used include polyester condensate dispersants and polyol ether dispersants. The content of the dispersant is generally about 0 to about 5% by mass.

The paste is applied to a portion to be bonded of a first element made of metal or ceramic and dried. Furthermore, a second element made of metal or ceramic is immobilized in contact with the dried paste film and then subjected to thermal treatment at 800 to 900° C. By this thermal treatment, the crystallizable glass powder is softened and fluidized to bond the first and second elements together. During this process, the precipitation of crystals occurs after the crystallizable glass powder is fluidized.

The crystallizable glass composition of the present invention can be used not only for bonding but also for other purposes, such as coating and filling. The crystallizable glass composition can also be used in forms other than paste, such as powder, a green sheet or a tablet (for example, a pressed body of crystallizable glass powder). For example, the crystallizable glass powder of the present invention may be filled, together with a lead, in a cylinder made of metal or ceramic and subjected to thermal treatment to hermetically seal the cylinder. Alternatively, a green sheet or a tablet may be put on an element made of metal or ceramic and subjected to thermal treatment to coat the element.

EXAMPLES

A description will be given below of the crystallizable glass composition of the present invention with reference to examples.

Tables 1 and 2 show examples of the present invention (Samples Nos. 1 to 9) and comparative examples (Samples Nos. 10 to 12).

TABLE 1

| Glass Composition (% by mole) | No. 1 | No. 2 | No. 3 | No. 4 | No. 5 | No. 6 |
|---|---|---|---|---|---|---|
| $SiO_2$ | 36 | 36 | 36 | 36 | 38 | 36 |
| MgO | 28 | 23 | 28 | 28 | 29 | 28 |
| BaO | 14 | 12 | 12 | 12 | 13 | 14 |
| CaO | — | 2 | — | — | — | — |
| SrO | — | — | 2 | — | — | — |
| $B_2O_3$ | 10 | 10 | 10 | 10 | 11 | 10 |
| ZnO | 5 | 5 | 5 | — | — | 5 |
| $Al_2O_3$ | 2 | 2 | 2 | — | — | 2 |
| $ZrO_2$ | — | — | — | 2 | — | — |
| $SnO_2$ | — | — | — | — | 2 | — |
| $La_2O_3$ | 5 | 10 | — | — | — | — |
| $Nb_2O_5$ | — | — | 5 | 12 | — | — |
| $Y_2O_3$ | — | — | — | — | 7 | — |
| $Ta_2O_5$ | — | — | — | — | — | 5 |
| $Yb_2O_3$ | — | — | — | — | — | — |
| Devitrification Resistance | ○ | ○ | ○ | ○ | ○ | ○ |
| Coefficient of | 128 | 123 | 122 | 114 | 114 | 120 |

TABLE 1-continued

| Glass Composition (% by mole) | No. 1 | No. 2 | No. 3 | No. 4 | No. 5 | No. 6 |
|---|---|---|---|---|---|---|
| Thermal Expansion ($\times 10^{-7}/°$ C.) | | | | | | |
| Glass Transition Point (° C.) | 656 | 680 | 649 | 660 | 701 | 667 |
| Softening Point (° C.) | 785 | 809 | 776 | 810 | 831 | 815 |
| Fluidity | o | o | o | o | o | o |
| Precipitated Crystal | A, B, C | A, B, C | A, B, C | A, B, C | A, B, C | A, B, C |
| Crystallization Temperature (° C.) | 872 | 896 | 881 | 930 | 920 | 917 |
| Crystalline Melting Point (° C.) | >1000 | >1000 | >1000 | >1000 | >1000 | >1000 |

TABLE 2

| Glass Composition (% by mole) | No. 7 | No. 8 | No. 9 | No. 10 | No. 11 | No. 12 |
|---|---|---|---|---|---|---|
| $SiO_2$ | 39 | 40 | 31 | 35 | 32 | 41 |
| MgO | 20 | 20 | 12 | 15 | 18 | 28 |
| BaO | 14 | 20 | 30 | 10 | 10 | 22 |
| CaO | — | — | — | — | — | — |
| SrO | — | — | — | — | — | — |
| $B_2O_3$ | 10 | 10 | 5 | 5 | 7 | 7 |
| ZnO | 5 | — | — | — | — | — |
| $Al_2O_3$ | 2 | 2 | — | — | — | 2 |
| $ZrO_2$ | — | — | — | — | — | — |
| $SnO_2$ | — | — | — | — | — | — |
| $La_2O_3$ | — | — | 11 | 35 | — | — |
| $Nb_2O_5$ | — | — | — | — | — | — |
| $Y_2O_3$ | — | — | 11 | — | 33 | — |
| $Ta_2O_5$ | 10 | — | — | — | — | — |
| $Yb_2O_3$ | — | 8 | — | — | — | — |
| Devitrification Resistance | o | o | o | x | o | o |
| Coefficient of Thermal Expansion ($\times 10^{-7}/°$ C.) | 138 | 136 | 121 | — | 93 | 127 |
| Glass Transition Point (° C.) | 672 | 668 | 681 | 705 | 703 | 665 |
| Softening Point (° C.) | 807 | 800 | 799 | 830 | 832 | 788 |
| Fluidity | o | o | o | x | o | x |
| Precipitated Crystal | A, B, C | A, B, C | A, B, C | — | Not precipitated | A, B, C |
| Crystallization Temperature (° C.) | 887 | 890 | 875 | 855 | — | 822 |
| Crystalline Melting Point (° C.) | >1000 | >1000 | >1000 | >1000 | — | >1000 |

Each sample was prepared in the following manner.

Each of glass raw materials prepared to have the component compositions shown in the above tables was melted at 1400 to 1500° C. for approximately an hour and the resultant molten glass was loaded between a pair of cooling rollers to form it in a film. The film-shaped formed body thus obtained was ground with a ball mill and classified to obtain crystallizable glass powder having a particle size ($d_{50}$) of approximately 10 μm.

Next, each sample was measured or evaluated for the devitrification resistance upon forming, the coefficient of thermal expansion, the glass transition point, the softening point, the fluidity, the type of precipitated crystal, the crystallization temperature, and the crystalline melting point in the following manners. The results are shown in Table 1.

The evaluation of devitrification resistance was made by observing the film-shaped formed bodies with a microscope (×50), wherein the samples not found to devitrify were indicated by "o" and the samples found to devitrify were indicated by "x".

The coefficient of thermal expansion was measured in the following manner. First, each sample was pressed into a shape and the pressed sample was subjected to thermal treatment at 850 to 1000° C., with the crystallization temperature plus 10° C. as a guide, for 15 minutes and then ground into the shape of a cylinder of 4 mm diameter and 20 mm length. Next, using the resultant sample in the cylindrical shape, the coefficient of thermal expansion within a temperature range of 30 to 700° C. was measured in accordance with JIS R3102.

The glass transition point, the softening point, the crystallization temperature, and the crystalline melting point were measured with a macro differential thermal analyzer. Specifically, in a graph obtained by measuring each glass powder sample up to 1050° C., the value of the first inflection point was considered as the glass transition point, the value of the fourth inflection point was considered as the softening point, the value of the exothermic peak was considered as the crystallization temperature, and the value of the endothermic peak obtained higher than the crystallization temperature was considered as the crystalline melting point. Note that as the crystalline melting point is higher or when no crystalline melting point is found, this means the crystals stably existing even at high temperatures and can provide the determination that the sample has high thermal resistance.

The fluidity was evaluated in the following manner. The same amount of glass powder as the specific gravity (1 cm³) was loaded into a molding die of 20 mm diameter and pressed to produce a formed body in the shape of a button. The obtained formed body was subjected to thermal treatment by holding it at 850 to 1000° C. for 15 minutes on a SUS430 plate. The formed bodies after the thermal treatment were evaluated by considering the formed bodies having a diameter of 17 mm or more as "o" and considering the formed bodies having a diameter of below 17 mm as "x".

The type of precipitated crystal was identified by comparing a diffraction chart obtained by an XRD measurement with the JCPDS card. As the types of precipitated crystals identified in the above manner, $2MgO.2SiO_2$, $BaO.2MgO.2SiO_2$, and $2MgO.B_2O_3$ are indicated by "A", "B", and "C", respectively, in the above tables.

As is evident from the tables, Samples Nos. 1 to 9, which are examples of the present invention, were not found to devitrify upon forming and exhibited excellent fluidity. In addition, MgO-based crystals were precipitated as main crystals and the samples had coefficients of thermal expansion as high as 114 to $138 \times 10^{-7}/°$ C.

On the other hand, Sample No. 10, which is one of the comparative examples, was easy to devitrify and difficult to vitrify and exhibited poor fluidity. Sample No. 11 precipitated no crystal even when undergoing the thermal treatment and exhibited a coefficient of thermal expansion as low as $93 \times 10^{-7}/°$ C.

Sample No. 12 exhibited poor fluidity.

INDUSTRIAL APPLICABILITY

The crystallizable glass composition of the present invention is suitable as an adhesive material for metals, such as SUS and Fe, and high-expansion ceramics, such as ferrite and zirconia. Furthermore, the crystallizable glass composition is suitable as an adhesive material for hermetically sealing a support substrate, an electrolyte, electrodes or other elements which are used in producing an SOFC.

REFERENCE SIGNS LIST

1 ... electrolyte
2 ... anode
3 ... cathode
4 ... first support substrate
4a ... fuel channel
5 ... second support substrate
5a ... air channel

The invention claimed is:

1. A crystallizable glass composition capable of precipitating MgO-based crystals as main crystals by thermal treatment, the crystallizable glass composition containing, in terms of % by mole in glass component composition, 0.1 to 30% $La_2O_3+Nb_2O_5+Y_2O_3+Ta_2O_5+Yb_2O_3$, 31% to 50% $SiO_2$, 10 to 45% MgO, 5 to 40% BaO, 0 to 15% $B_2O_3$, 0 to 20% CaO, and 0 to 6% $Al_2O_3$, wherein the crystallizable glass composition is in powder form.

2. The crystallizable glass composition according to claim 1, containing 0.1 to 30% $La_2O_3$.

3. The crystallizable glass composition according to claim 1, containing, in terms of % by mole in component composition, 5% or less $R_2O$ (where R represents Li, Na or K) and 5% or less $P_2O_5$.

4. The crystallizable glass composition according to claim 1, wherein the MgO-based crystals are $2MgO \cdot SiO_2$, $BaO \cdot 2MgO \cdot 2SiO_2$ or $2MgO \cdot B_2O_3$.

5. The crystallizable glass composition according to claim 1, further containing, in terms of % by mole in glass component composition, 0 to 10% SrO, 0 to 15% ZnO, 0 to 3% $ZrO_2$, and 0 to 3% $SnO_2$.

6. The crystallizable glass composition according to claim 1, having, after undergoing the thermal treatment, a coefficient of thermal expansion of $95 \times 10^{-7}/°C$. or above at 30 to 700° C.

7. An adhesive material in which the crystallizable glass composition according to claim 1 is used.

8. The adhesive material according to claim 7, which is for use in bonding component elements of a fuel cell.

* * * * *